April 16, 1968 E. M. CUMMINGS 3,378,719

BLANKING SYSTEM

Filed March 31, 1966

INVENTOR.
Eugene M. Cummings

BY

Attorney

United States Patent Office
3,378,719
Patented Apr. 16, 1968

3,378,719

BLANKING SYSTEM

Eugene M. Cummings, Park Ridge, Ill., assignor to Zenith Radio Corporation, Chicago, Ill., a corporation of Delaware Filed Mar. 31, 1966, Ser. No. 539,062
7 Claims. (Cl. 315—22)

ABSTRACT OF THE DISCLOSURE

A blanking system for a television picture tube has a source of horizontal retrace pulses, a source of vertical retrace pulses and a control circuit for deriving a composite blanking signal therefrom. One terminal of each source is returned to a plane of reference potential. The control circuit includes a pair of diodes with the anode electrode of each coupled to a common junction and to a terminal of the horizontal pulse source. The diodes are so poled at this juncture as to be reversed biased to the horizontal retrace pulses. The cathode of one diode is returned to reference potential and the cathode of the other is coupled to the source of vertical pulses. The aforesaid one diode is reversed biased relative to the vertical pulses while the other diode is forwardly biased relative thereto. A composite blanking signal is developed at the diode juncture and is coupled to the cathode of the picture tube to blank the beam during intervals corresponding to the periods of the retrace pulses.

Figures 1, 2:
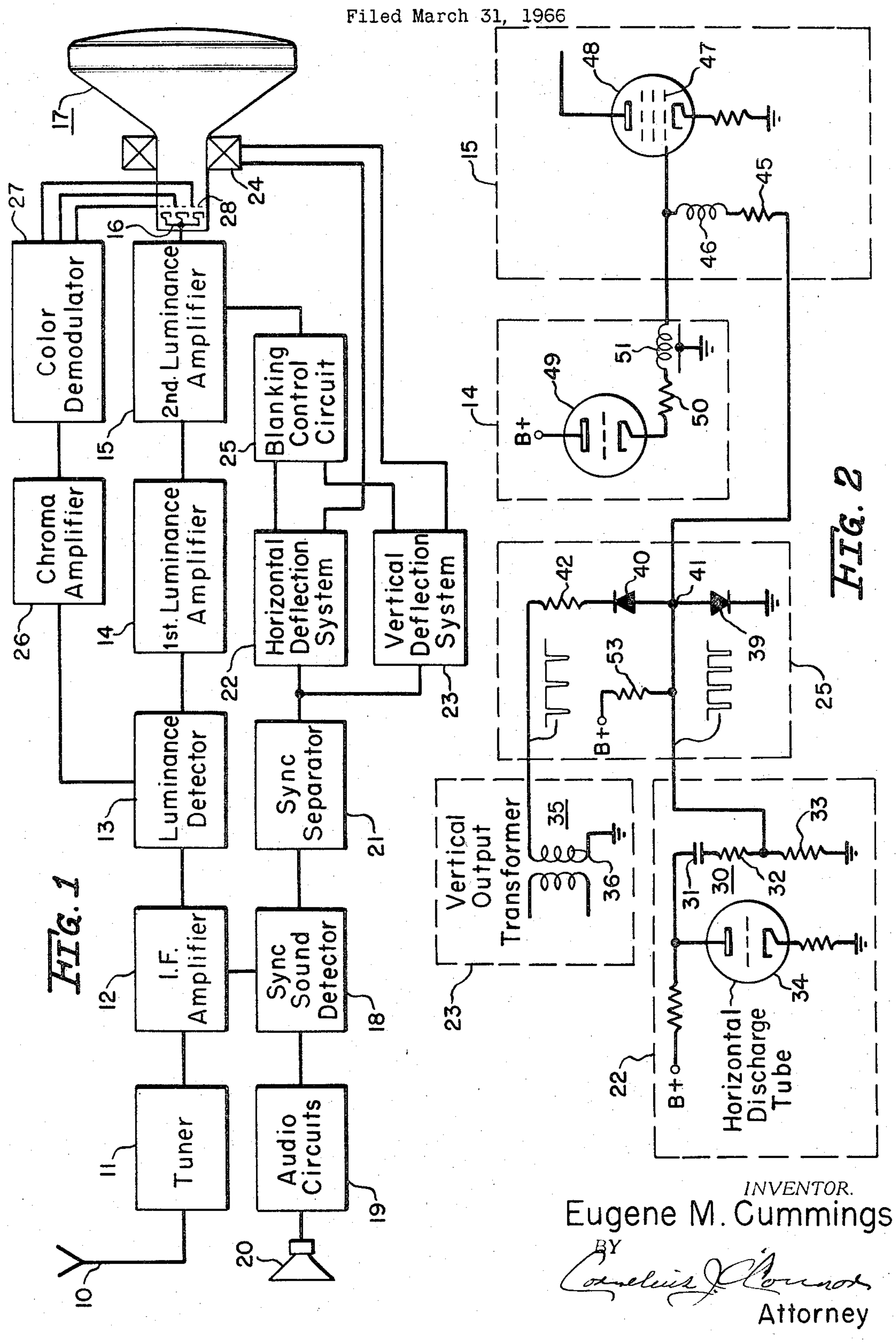

This invention relates in general to control circuitry for image reproducers; more particularly, the invention is directed to an improved blanking system for the image reproducing tube of a color television receiver.

It is imperative that the image reproducing tube of a television receiver be provided with a blanking system in order to deenergize or interrupt the scanning beam of the tube for intervals sufficiently long to permit the beam to return to a point from which the next scansion line or frame is initiated. Failure to completely blank the beam during these intervals permits the beam to illuminate a portion of the screen which should remain darkened. As a result, a retrace line is produced and superimposed upon the reproduced image. Furthermore, it can be appreciated that failure to achieve proper blanking in a color receiver is potentially more disturbing to the viewer than the same shortcoming in a monochrome receiver.

Retrace blanking has long been practiced in the monochrome television art and is customarily achieved by applying horizontal frequency and vertical frequency blanking pulses to a control electrode of the image reproducer to cut off the beam during intervals coincident with retrace periods. Theoretically, a clean, sharply defined pulse of sufficient magnitude should provide total blanking of the beam. From a practical standpoint, however, clean, sharply defined pulses are difficult to derive in the receiver without recourse to sophisticated, expensive circuitry.

Achieving complete retrace blanking in a color receiver, however, is substantially more difficult than blanking a monochrome receiver. In the conventional monochrome receiver, for example, the picture information is borne by a video signal which is applied to the cathode of the electron gun while the blanking signal is applied to a grid type electrode. Obviously, the roles of the cathode and grid can be interchanged if due consideration is given the polarity of the applied signals. At any rate, video information is applied to one electrode and the blanking signal is applied to another.

In color television receivers, however, in addition to a blanking signal and a luminance or brightness signal, consideration must also be given to the chroma signal from which three color information signals are derived. Additionally, the conventional color image reproducer employed today comprises a cathode ray tube device having a triple electron gun arrangement. Each such gun includes at least a cathode and a control grid to control the intensity of its electron beam in accordance with applied signals. Conventional practice then is to apply the luminance signal to the three cathodes and to couple the color information signals individually to assigned ones of the control grids.

In addition to having picture information signals on the cathode, as well as the grid, the range of signal potentials in a color receiver is substantially greater than that encountered in monochrome receivers. Consequently a conventionally derived blanking pulse does not have sufficient magnitude to effect blanking.

In accordance with one prior art arrangement a color receiver is blanked by applying vertical retrace pulses to the cathodes of the image reproducer and horizontal retrace pulses to the color demodulator tubes which translate the blanking information to the control grids of the picture tube. In this as well as other prior art practices it has proved difficult to eliminate transients from the horizontal synchronizing pulse. These transients, in the form of overshoots and preshoots about the leading and trailing edges of the horizontal synchronizing pulse, are borne atop the horizontal blanking pedestal. While the level of the horizontal synchronizing pulse pedestal is in itself sufficient to cut the beam off, it is frequently the case that the transients have sufficient amplitude to momentarily gate the beam back on. This gating of the beam is manifested as a vertical line near the left hand portion of the screen and constitutes an annoying disturbance in the reproduced image.

It is therefore an object of this invention to provide an improved blanking system for television receivers.

It is another object of the invention to provide a horizontal and vertical retrace blanking system for a color television receiver.

It is also an object of the invention to provide a novel control circuit for deriving a composite blanking signal for a television receiver.

It is a more specific object of the invention to provide a retrace blanking system for a television receiver which precludes sync pulse transient induced distortion in a reproduced image.

In accordance with the invention a blanking system for a television image reproducer having electron beam generating means, including a pair of electrodes for controlling the intensity of the beam in accordance with applied voltage, comprises a high impedance source of horizontal retrace pulses of predetermined polarity, a low impedance source of vertical retrace pulses of like polarity and a control circuit for deriving a composite blanking signal. The control circuit comprises a pair of unidirectional conduction devices each having an anode and a cathode electrode. A like electrode of each device is coupled to a common juncture. Means are provided for returning the electrode of one of the unidirectional devices remote from the juncture to one terminal of each of said pulse sources. Means are also provided for coupling another terminal of the high impedance source to the juncture, the unidirectional conduction devices being poled at the juncture so as to be reverse biased to high impedance retrace pulses. Means are further included for coupling another terminal of the low impedance pulse source to the electrode of the other unidirectional conduction device remote from the juncture, this other device being forwardly biased relative to the low impedance retrace pulses while the aforesaid one device is reverse biased relative to the low impedance retrace pulses. Finally, the blanking system includes means for coupling a composite blanking signal from the juncture of the unidirectional devices to one of the electrodes of the images reproducer to interrupt its electron beam during intervals corresponding to the periods of the retrace pulses.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIGURE 1 is a block diagram of a color television receiver which embodies a blanking system constructed in accordance with the invention; and FIGURE 2 is a schematic diagram detailing components of the blanking system for the receiver shown in FIGURE 1.

The color television receiver depicted in FIGURE 1 comprises an antenna 10 which is coupled to a tuner 11 that includes radio frequency amplifying and heterodyning stages. An intermediate frequency output terminal of tuner 11 is coupled to an IF amplifier 12 which, in turn, is coupled to a luminance detector 13. The video frequency output of detector 13 is coupled through a first luminance amplifier 14, comprising a cathode follower stage and a delay network, to a second luminance amplifier 15. The amplified video signal output of stage 15 is then applied to the cathode electrodes 16 of a three gun color image reproducing cathode ray tube 17.

The output of IF amplifier 12 is also coupled to a sync and sound detector 18, one output terminal of which is coupled via conventional audio circuits 19 to a loud speaker 20. Another output terminal of detector 18 is coupled to a sync separator 21 which applies horizontal and vertical synchronizing signals to the horizontal and vertical deflection systems 22, 23 respectively. An output terminal of each of systems 22, 23 is coupled to a deflection yoke 24 which is associated with image reproducer 17. A second output terminal of the horizontal deflection system 22 is coupled to blanking control circuit 25, as is a second output terminal of vertical deflection system 23. The output of circuit 25 is coupled to the second luminance amplifier 15.

Luminance detector 13 is a further coupled through a chroma amplifier 26 to a color demodulator 27, which may comprise any suitable known type of detector capable of demodulating the color modulated subcarrier signal. The output terminals of demodulator 27 are coupled to assigned ones of the control electrodes 28 included in the beam generating guns of cathode ray tube 17.

With the exception of the blanking system, which is described in detail below, the color television receiver shown in FIGURE 1 is quite conventional; accordingly, only a brief description of its operation is deemed necessary. The tunable stages of tuner 11 are adjusted to select a desired signal which is amplified and then heterodyned with a locally generated signal to develop an intermediate frequency signal. This signal is amplified in stage 12 and then applied to luminace detector 13 and to the sync and sound detector 18.

Detector 13 abstracts a luminance signal, as well as a color or chroma signal, and presents them to amplifiers 14 and 26, respectively. The luminance signal is subjected to two stages of amplification by first and second amplifiers 14, 15 and then applied simultaneously to each of cathodes 16 of image reproducer 17. In this fashion the brightness of a reproduced image is controlled by modulating the electron beam in accordance with luminance information. The chroma signal is amplified in stage 26 and then processed by demodulator 27 which develops three color difference signals. The color signals are individually, but concurrently, applied to assigned ones of control grids 28 to establish the color values in the reproduced image.

Stage 18 derives the audio information from the received signal and employs it to drive circuits 19 in a known fashion to reproduce the audio program accompanying the telecast. The output of detector 18 is also employed to control the horizontal and vertical deflection systems 22, 23. To this end sync separator 21 derives synchronizing pulses from the output of detector 18 and applies such pulses to systems 22, 23 which deflect the electron beams generated within cathode ray tube 17 in at predetermined manner to develop a raster upon the screen of the tube. Since the electron beams are simultaneously modulated by the luminance information coupled to cathodes 16 and by the chrominance information applied to grids 28, the deflection of the beams under the influence of the horizontal and vertical deflection systems reproduces a color image upon the viewing surface of tube 17.

Attention is now directed to FIGURE 2 which schematically illustrates the constituents of an improved blanking system. More particularly, this system comprises a high impedance source 30 of negatively polarized horizontal retrace pulses comprising the series combination of a capacitor 31 and a pair of resistors 32, 33. This combination is coupled across the output of the horizontal discharge tube 34, included within horizontal deflection system 22, with one terminal of resistor 33 returned to a plane of reference potential. A low impedance source 35 of negatively polarized vertical retrace pulses comprises a winding 36, or a portion thereof, on the vertical output transformer which, of course, is included in vertical deflection system 23. One terminal of winding 36 is returned to the same plane of reference potential as the one terminal of resistor 33 of high impedance pulse source 30.

Control circuit 25, which derives the composite blanking signal, comprises a pair of unidirectional conduction devices, diodes 39, 40, each having an anode and a cathode electrode. In the disclosed blanking system, which is intended to utilize negatively polarized retrace pulses, like electrodes of each of diodes 39, 40, in this instance the anodes, are coupled to a common juncture 41. Circuit 25 also includes means for returning the electrode of diode 39 which is remote from juncture 41 to one terminal of each of pulse sources 30, 35. To this end the cathode of diode 39 is connected to the plane of reference potential.

Means are also provided for coupling an output terminal of high impedance pulse source 30, specifically the juncture of resistors 32, 33, to diode juncture 41. With the anodes of diode 39, 40 coupled to juncture 41 these devices are poled so as to be reverse biased to negatively polarized retrace pulses. This obtains, of course, since the anode of a diode presents a high impedance to a negative signal and, conversely, a low impedance to a positively polarized signal. It is appreciated that the subject blanking system could employ positively polarized retrace pulses; in that circumstance, of course, the posture of diodes 39, 40 relative to juncture 41 would be reversed, that is, the cathodes of the diodes would be coupled to juncture 41.

Circuit 25 further includes means for coupling an output terminal of low impedance source 35 to the electrode of diode 40 which is remote from juncture 41. More particularly, the high potential terminal of winding 36 is coupled to the cathode of diode 40 through an isolation resistor 42. In this fashion diode 40 is forwardly biased by the negatively polarized retrace pulses of source 35 while diode 39, since it presents its anode to juncture 41, is reverse biased relative to source 35.

Additionally, means are provided for coupling the composite blanking signal derived from juncture 41 to appropriate control electrodes of cathode ray tube 17 in order to interrupt the electron beams of that tube during intervals corresponding to the periods of the retrace pulses. In the disclosed embodiment second luminance amplifier 15 comprises the means for coupling blanking signal from the control circuit to the image reproducer. As shown in FIGURE 2, juncture 41 is a coupled via a resistor 45 and an inductor 46 to the control grid 47 of a pentode amplifier 48 which serves as the second luminance amplifier. First luminance amplifier 14, which is disclosed as comprising a triode 49 connected as a cathode follower, is also coupled to control grid 47 through a resistor 50 and a delay line 51.

Since positively oriented luminance signals are applied to the cathode of the image reproducer, in accordance with U.S. television transmission standards, this requires that the luminance signal applied to the last luminance amplifier be negatively oriented. Therefore, with luminance amplifier 15 additionally constituting a coupling means for the composite blanking signal, it is appropriate to insure that the luminance signal is not adversely affected by the constituents of blanking control circuit 25, specifically by diode 39. To this end a DC biasing circuit is provided for diode 39. This circuit comprises a resistor 53 which returns the dode juncture 41 to a source of positive potential B+. The value of resistor 53, is selected to maintain diode 39 in a slight forward bias condition at all times. With diode 39 thus biased, juncture 41 is effectively established as an AC ground or reference plane for a predetermined range of negatively oriented luminance signals developed across inductor 46 and resistor 45, the input circuit for amplifier 48. In this fashion clipping of the negative excursions of the luminance signal by diode 39 is precluded. However, since the magnitude of the negatively polarized retrace pulses greatly exceed the forward bias applied to diode 39, the functioning of that diode in its blanking circuit environment is not materially affected.

In operation, a composite blanking signal is derived by combining horizontal and vertical retrace pulses. Referring specifically to FIGURE 2, negatively polarized horizontal retrace pulses developed across resistor 33 are applied to diode juncture 41. Since diodes 39, 40 present their respective anode electrodes to the negative pulses, they are back biased and thus constitute high impedances which cannot adversely load pulse source 30.

Simultaneously, negative vertical retrace pulses are developed across winding 36 and coupled to juncture 41 by applying the pulses to the cathode of diode 40. In this instance diode 40 constitutes a low impedance to retrace source 35 since the negative pulses forwardly bias the diode. However, from the standpoint of juncture 41 both diodes are back biased relative to negative pulses and therefore present high impedances to sources 30, 35. Thus low impedance pulse source 35 cannot load high impedance pulse source 30 nor the input circuit of luminance amplifier 48, for that matter, in view of the isolation afforded by the back-to-back diode arrangement (39,40) of control circuit 25.

Juncture 41 thus provides a composite blanking signal comprised of negatively polarized horizontal and vertical retrace pulses. These pulses are applied to the control grid of amplifier 48 through resistor 45 and inductor 46. By virtue of the phase inverting characteristic of amplifier 48, the retrace pulses are applied with positive polarity to the cathodes 16 of image reproducer 17 thereby blanking or interrupting the electron beams during the periods of the retrace pulses.

In contradistinction to prior art blanking systems for color image reproducers, the described blanking system achieves blanking by applying vertical and horizontal retrace pulses to the same electrode of each electron gun. Moreover, by including luminance amplifier 15 in the blanking system clean, sharply defined retrace pulses free of transient overshoots are developed. Additionally since no blanking pulses are introduced to the image reproducer through the chroma demodulating circuitry, that circuitry need not be burdened with safeguards to avoid cross-talk, etc.

It is appreciated that the horizontal discharge tube constitutes but one readily available high impedance source of retrace pulses in the horizontal deflection system. By the same token, it is also appreciated that winding 36 of the vertical output transformer constitutes but one readily available low impedance source of retrace pulses in the vertical deflection system. Other sources of retrace pulses satisfying the requirements of the disclosed blanking system will occur to those skilled in the art.

A blanking system has been constructed in accordance with the schematic diagram of FIGURE 2 and has been found to give very satisfactory performance; merely by way of illustration and in no sense by way of limitation, some of the circuit parameters for the blanking system so constructed are as follows:

| | |
|---|---|
| B+ | 250 volts. |
| Discharge tube **34** | Triode section of a 6U10. |
| Amplifier **48** | 12GN7 pentode. |
| Amplifier **49** | Triode section of a 6KT8. |
| Diodes **39, 40** | 1N34. |
| Resistor **32** | 47,000 ohms. |
| Resistor **33** | 10,000 ohms. |
| Resistor **42** | 470 ohms. |
| Resistor **45** | 1500 ohms. |
| Resistor **53** | 150,000 ohms. |
| Inductor **46** | 42 microhenries. |

The described blanking system is an effective and inexpensive arrangement for blanking the electron beams of a color image reproducer. Moreover, the system successfully avoids the shortcomings of prior art arrangements without imposing operating difficulties upon the color and luminance modulating circuitry of the image reproducer.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A blanking system for a television image reproducer having electron beam generating means including a pair of electrodes for controlling the intensity of said electron beam in accordance with applied voltage and a horizontal deflection circuit and a vertical deflection circuit associated therewith, said blanking system comprising:
   a high impedance source of retrace pulses of predetermined polarity;
   a low impedance source of retrace pulses of like polarity;
   a control circuit for deriving a composite blanking signal comprising
   a pair of unidirectional conduction devices each having anode and cathode electrodes, a like electrode of each being coupled to a common juncture,
   means for returning the electrode of one of said unidirectional devices remote from said juncture to one terminal of each of said pulse sources;
   means for coupling another terminal of said high impedance pulse source to said juncture, said unidirectional conduction devices being poled at said juncture so as to be reverse biased to said high impedance retrace pulses,
   means for coupling another terminal of said low impedance pulse source to the electrode of the other of said unidirectional conduction devices remote from said juncture,
   said other device being forwardly biased relative to said low impedance retrace pulses and said one device being reverse biased relative to said low impedance retrace pulses;
   and means for coupling a composite blanking signal from said juncture of said unidirectional devices to one of said image reproducer electrodes to interrupt said electron beam during the intervals corresponding to the periods of said retrace pulses.

2. A blanking system as set forth in claim 1 in which said unidirectional devices comprise diodes each having an anode and a cathode with the anode electrode of each of said diodes coupled to said common juncture.

3. A blanking system as set forth in claim 1 in which one of said electrodes included in said beam generating means comprises a cathode and said means for returning the electrode of one of said unidirectional devices remote from said juncture to one terminal of each of said pulse sources comprises a plane of reference potential and said composite blanking signal is applied between said cathode electrode and said plane of reference potential.

4. A blanking system as set forth in claim 1 in which said high impedance source of retrace pulses is included in said horizontal deflection circuit for said image reproducer and said low impedance source of retrace pulses is included in said vertical deflection circuit for said image reproducer.

5. A blanking system as set forth in claim 1 in which said retrace pulses are of negative polarity.

6. A blanking system as set forth in claim 1 in which said means for coupling said blanking signal to said image reproducer comprises an amplifier device which translates luminance information to said one of said image reproducer electrodes.

7. A blanking system as set forth in claim 6 and further including a biasing means for forwardly biasing said one unidirectional conduction device.

No references cited.

RODNEY D. BENNETT, *Primary Examiner.*

T. H. TUBBESING, *Assistant Examiner.*